United States Patent [19]
Elwell

[11] Patent Number: 5,142,199
[45] Date of Patent: Aug. 25, 1992

[54] ENERGY EFFICIENT INFRARED LIGHT SWITCH AND METHOD OF MAKING SAME

[75] Inventor: Brian E. Elwell, Brentwood, Calif.

[73] Assignee: Novitas, Inc., Santa Monica, Calif.

[21] Appl. No.: 619,794

[22] Filed: Nov. 29, 1990

[51] Int. Cl.⁵ ............................................. H05B 41/36
[52] U.S. Cl. .................................... 315/154; 315/159;
250/221; 307/116; 340/567
[58] Field of Search .............. 315/154, 155, 149, 150,
315/159, 158, 307, 194, 291, 360, 361, 315,
DIG. 4, 152; 250/221, 216, 203.1, 353; 362/125;
307/116, 117; 340/565, 567

[56] References Cited

U.S. PATENT DOCUMENTS

| | | | |
|---|---|---|---|
| 3,898,383 | 8/1975 | Herbits | 315/291 X |
| 4,225,808 | 9/1980 | Saraceni | 250/221 X |
| 4,305,006 | 12/1981 | Walthall et al. | 250/221 X |
| 4,433,328 | 2/1984 | Saphir | 340/555 |
| 4,595,915 | 6/1986 | Close | 340/572 |
| 4,661,720 | 4/1987 | Cameron, Jr. et al. | 307/117 |
| 4,663,521 | 5/1987 | Maile | 250/221 |
| 4,703,171 | 10/1987 | Kahl et al. | 250/221 |
| 4,719,363 | 1/1988 | Gallacher | 250/221 X |
| 4,873,469 | 10/1989 | Young et al. | 315/155 |

Primary Examiner—Eugene R. LaRoche
Assistant Examiner—Ali Neyzari
Attorney, Agent, or Firm—Robbins, Dalgarn, Berliner & Carson

[57] ABSTRACT

An energy efficient light switch providing dual switching capability for banks of overhead lights through the detection of infrared energy activity in a room. The switch has three positions preset by the user, activating a sufficient, but limited amount of light for a room through the automatic control of all, none or a portion of the banks of lights in the room. The switch is operable at 277 volts or 120 volts, has a sweep range of from 0° to 180° and is applicable for most lighting fixtures, fluorescent as well as incandescent and replaces the standard wall mounted wall switchplate. A method of manufacturing the energy efficient infrared light switch is also disclosed.

14 Claims, 2 Drawing Sheets

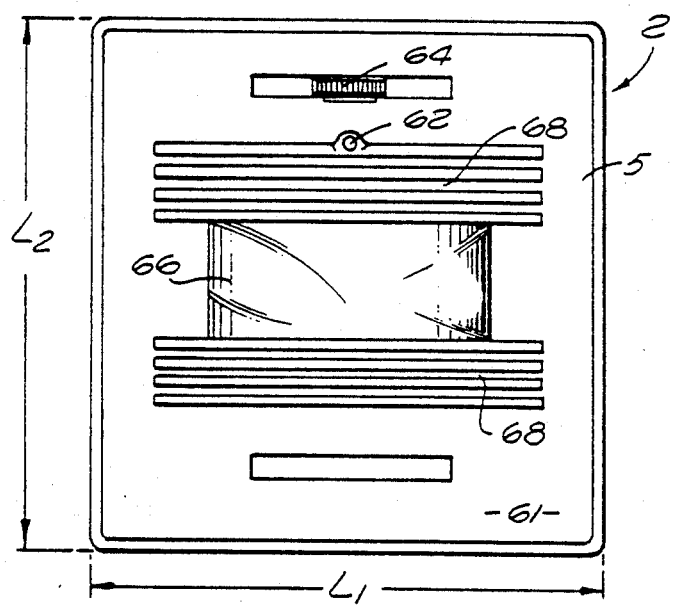
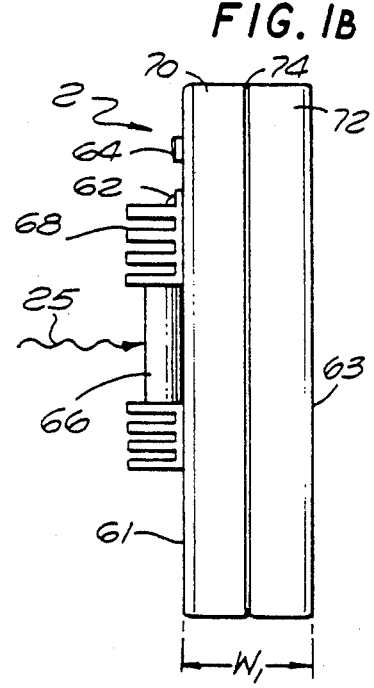
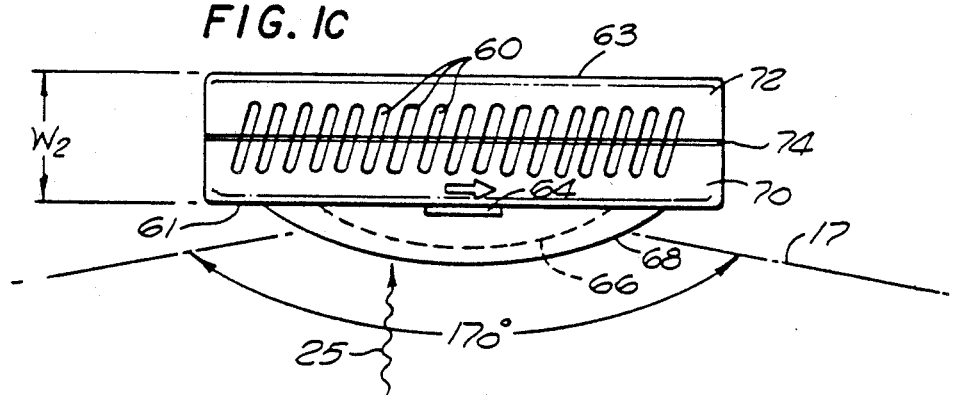
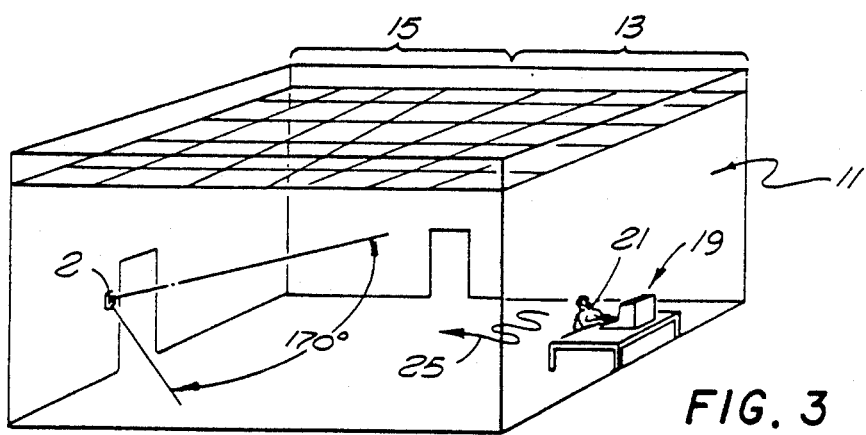

ENERGY EFFICIENT INFRARED LIGHT SWITCH AND METHOD OF MAKING SAME

BACKGROUND OF THE INVENTION

The present invention relates to an energy efficient light switch and more particularly to a switch which enables the automatic control of all, none or one half of the lights in a bounded area by the detection of infrared energy radiated by people working in that area.

The laws of some states require the installation of two light switches in the construction or reconstruction of individual offices. The two light switches each control a different half of the overhead lighting in a given office area. The reasoning behind such laws is that in the interest of energy conservation, employees may be offered the opportunity to use one half of the light they would normally require in their day-to-day activities. An employee may, upon entering the room and dependent upon the amount of ambient light available, select to use only one half of the bank of lights.

Further, employees may tailor the light needs to their activities and location in the room. For example, employees working at their desks would require only light in that area during the work day, while other areas of their office would not require additional artificial lighting. Energy conservation is a critical national and worldwide issue. Utilizing office lighting such that only 50% is used day-to-day results in enormous energy savings.

However, the goals of dual light switch codes are often defeated by the failure of the individual employee to use only one of the two available switches. In most instances, the employee automatically activates both light switches upon entering a room enabling both banks of lights. The employee does not take notice of the ambient light available through windows or other sources and so wastes up to 50% of the lighting energy.

It would be advantageous to have an automatically energy efficient switch that would be activated when the infrared radiated by an occupant is detected, thereby activating only one half of the lighting available in the room.

It would be further advantageous to have an automatically activated energy efficient switch that would selectively activate the lights in an office thereby providing a non-glare atmosphere for specified work stations. For example, in some work environments a computer work station having a cathode ray tube or color monitor can be illuminated without glare only when a limited number of lights in the room are activated.

Infrared detectors are well known. Passive, as well as active, infrared detectors have been used extensively to detect thermal gradient changes generated in a room by people or animals. It would be advantageous to incorporate a simple passive infrared detector into a light switch configuration, replacing existing wall-mounted light switches. Such a detector does not emit infrared energies, but passively receives any infrared energies radiated by the sweep area under detection. A passive system incorporating two detectors would be operable to provide a device having a field of view or sweep of approximately 170° to 180°.

SUMMARY OF THE INVENTION

The present invention provides an energy efficient infrared light switch and an automatic lighting system that resolves the problem of relying upon human judgment to conserve energy through the selective actuation of only one half of the lights available within a bounded area. The light switch is preset by the user using a three-position switch to turn on or off all, none or one half of the lights.

This invention produces an energy conservation system that is manufacturable in a controlled consistent manner using existing technology having reliable characteristics. More particularly, the invention provides an energy efficient light switch that has at least two passive infrared detectors which are operable to receive infrared energy emitted from within a bounded area within a designated sweep range, converting the received infrared energy into a voltage signal. The switch also includes means to amplify the voltage signal and a window comparator to compare the signal to two known predetermined voltages. A signal detection indicator is operable to compare the received amplified signal to the predetermined signal and to be actuated into the "on" position indicating motion detection. A dual power supply having a first and second power circuit provides the predetermined voltages to the window comparator and also provides power to the passive infrared detectors. A push-pull circuit including a latching relay coil selectively activates all, none or one half of the lights that are cooperatively associated with the light switch based upon the detection of infrared energy within the bounded area.

The automatic lighting system incorporates at least two lamps mounted within a bounded area, an external power supply which can supply a predetermined voltage to the lamps and a selectively actuating passive infrared light switch within the circuit between the lamps and the power source. This selectively actuating passive light switch serves to actuate upon the receipt of infrared energy within the bounded area all, none or one half of the two lighting loads in response to this information.

BRIEF DESCRIPTION OF THE DRAWINGS

A complete understanding of the present invention and the above advantages may be gained from a consideration of the following description of the preferred embodiments taken in conjunction with the accompanying drawings in which:

FIG. 1A is a front plan view of the exterior of the energy efficient infrared light switch;

FIG. 1B is a side plan view of the energy efficient infrared light switch;

FIG. 1C is a top plan view of the exterior of the energy efficient infrared light switch;

FIG. 3 is a schematic representation of the energy efficient infrared light system incorporating the switch detecting a computer operator in a room and actuating one bank of available lights.

DETAILED DESCRIPTION

Figure 2:
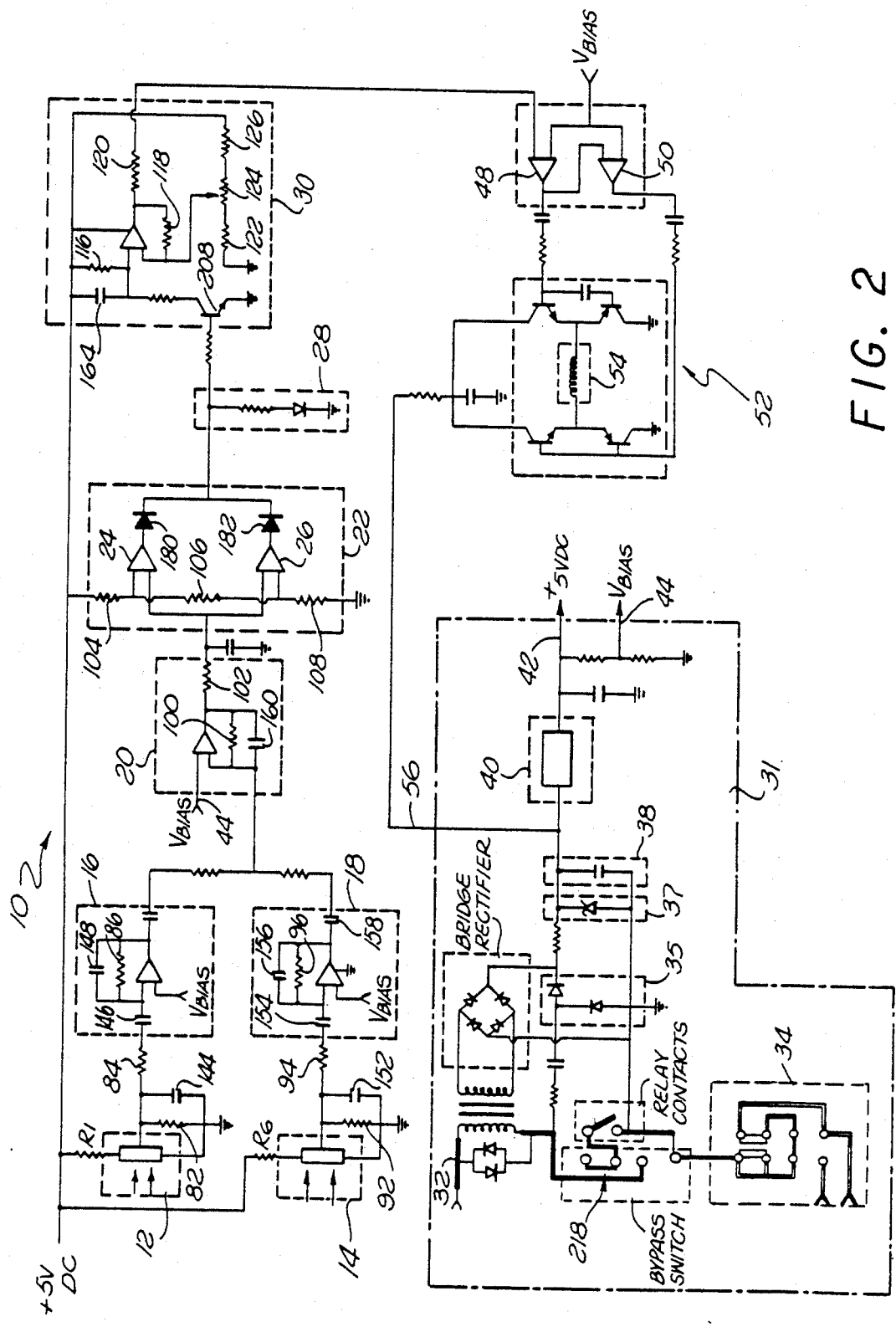
FIG. 2 is a schematic representation of the electric circuit for the energy efficient infrared light switch.

The invention, an energy efficient infrared light switch, replaces an existing standard wall switch and consists of at least two infrared detectors which can provide the device with a sweep of 170° to 180° within a bounded area. The infrared light switch is preset by the user to selectively activate all, none or a portion of the lights activated by the switch using the three-position switch. Through the use of two passive infrared detectors, the energy received by those detectors is converted to signals which are then separately amplified, mixed and then jointly amplified. The mixed amplified signal is sent to a window comparator which compares the amplified, mixed signals to two predetermined known voltage signals. If the received amplified mixed signal is greater than the high setpoint of the window comparator, or lower than the low setpoint of the window comparator, a signal indicator is initiated indicating motion detection. The dual power supply in conjunction with a push-pull circuit and latching relay coil, then selectively actuates all, none or one half of the lamps available within the bounded area.

FIG. 1A is a front plan view of the exterior case 5 of the energy efficient infrared light switch 2. The exterior case 5 has a light emitting diode (LED) 62 as a signal detection indicator. A three-position switch 64, located upon the front of the exterior case 5, facilitates the individual setting of the light efficient switch 2 to selectively actuate all, none or one half of the lights. The infrared detectors 66, 66' can be seen beneath the surface of the casing 5 within a protective cover. A stylus groove 68 provides ornamental decoration, but more importantly, also facilitates the receipt of infrared energy from the bounded area under review. The front surface 61 of the energy efficient infrared light switch 2 has a length L1 and a width L2. An example of one configuration would be a square length, with L1 and width L2 each being 4.25 inches.

FIG. 1B is a side plan view of the exterior of the energy efficient infrared light switch 2 where its front surface 61 is exposed to a room and its back surface 63 is fixably mounted to a wall or corner. An interfitting seal 74 joins the front faceplate portion 70 of the switch and its rear cover portion 72. The stylus groove 68 can be seen inscribed upon the surface of the faceplate portion 70 where the three-position switch 64 is located above the light emitting diode 62. As shown in FIG. 1B, infrared energy 25 strikes the surface of the infrared detector 66. The energy efficient infrared light switch 2 is shown in this example as mountable to the surface of the wall interior to the bounded area.

FIG. 1C is a top plan view of the exterior casing 5 of the switch 2. As can be seen clearly here, the faceplate 70 is interconnected with an interfitting seal 74 to a portion of the rear cover 72. Vents 60 are intercut into the faceplate 70 and rear cover 72 providing for movement of air circulation about the circuitry. The front surface 61 of the faceplate 70 faces the interior of a bounded area or room. The back surface 63 attaches or mounts to a wall or a corner within that bounded area. The field of view 17 or sweep range in this example using two detectors is between 170° to 180°. Infrared energy 25 is shown striking the detector 66. As shown above the stylus groove 68, this three position switch 64 is operable to allow the detector switch 2 to be set to actuate all, none or one half of the lights.

FIG. 2 is a schematic representation of the electrical circuit for the energy efficient infrared light switch 2. The circuit 10 comprises a first infrared detector 12 and a second infrared detector 14 which are operable to provide a combined sweep range of 170° to 180°.

This sweep range is wide enough to facilitate detection within a bounded area. The front end or first amplifier 16 for the first detector 12 includes an operational amplifier which converts and amplifies the infrared energy 25 received by the first infrared detector 12. The front end or first amplifier 18 for the second infrared detector 14 is also an operational amplifier and receives radiated infrared converted energy detected by the second infrared detector 14. Resistors R1 and R6 both having a value of 100K ohms, are in series, respectively, with the first and second infrared detectors 12 and 14. The first and second detectors 12 and 14, respectively, are not active since they do not emit infrared energy which is then redetected upon its return to the system. Rather the detectors passively await the receipt of infrared energy 25 emitted from within the bounded area. The received signals in the passive detectors 12 and 14 are filtered through a resistant capacitance filter having a resistor 82 with value of 220K ohms, a capacitor 144 having a value of 0.022 microfarads and a third resistor 84 having a value of 10K ohms.

As shown in FIG. 2, the second infrared detector 14 also includes a second filtering system wherein resistance 92 having a value of 220K, a capacitance 152 having a value of 0.022 microfarads, and a second resistance 94 having a value of 10K ohms, also serve to filter the received signal.

As shown in FIG. 2, the front end amplifier 16 for the first infrared detector 12 contains an operational amplifier and two capacitors 146 having a value of 10 microfarads, a capacitor 148 having a value of 0.01 microfarad and a resistor 86 having a value of 2.7 megohms. A parallel system, a front end amplifier 18 for the second infrared detector 14, also contains capacitors 154 having a value of 10 microfarads, a capacitor 156 having a value of 0.01 microfarad, a resistor 96 having a value of 2.7 megohms, and a third capacitor 158 having a value of 10 microfarads. Operational amplifiers in both front end amplifiers 16 and 18 receive a bias voltage 44 from the dual power system 31.

In FIG. 2, the signals that have been filtered and amplified individually from the first and second infrared detectors 12 and 14, are combined and enter the second amplification stage 20. The signal enters a second operational amplifier and a resistive capacitance circuit having a resistor value for resistor 100 of 2.2 megohms, a capacitor 160 having a value of 0.01 microfarad, and a second resistor 102 having a value of 2.2 kilohms. Again, the operational amplifier of the second amplification stage 20 is driven by a voltage bias 44 which is also received from the dual power supply 31.

The twice-amplified mixed, combined received signal from the first and second infrared detectors 12 and 14, respectively, finally enters a window comparator 22, containing first and second comparator circuits 24 and 26, respectively, which includes operational amplifiers and resistors 104, 106 and 108, which have values of 22K, 10K and 15K, respectively. The comparator circuit also includes two diodes, 180 and 182 which are both 1N4148 diodes. The received double amplified signal is compared in a comparator circuit 22 to the setpoint voltages established by the voltage divider network of resistors 104, 106 and 108. If the received amplified signal is either greater than the high setpoint, or lower than the low setpoint of the window comparator circuit 22, then the indicator detector, here a light emitting diode (LED) 28, is actuated to the "on" position demonstrating that infrared energy has been detected. The output signal from the comparator 22 after it illuminates the LED 28 when motion is detected, enters into a timing circuit 30 which includes a transistor 208, a resistor 114 which has a value of 100 ohms, a capacitor 164 which has a value of 100 microfarads, a resistor 116 which has a value of 6.8 megohms, a resistor 120 which has a value of 100 ohms, a resistor 118 which has a value of 100K ohms, and three resistors, 122, 124 and 126, having respective values of 620 ohms, 10K ohms and 3.9 kilohms. The timing circuit 30 provides a time delay for the detection of infrared energy variable between 30 seconds and 15 minutes, where variable resistor 124 is set.

As shown in FIG. 2, the electrical circuit for the energy efficient switch includes a dual power supply circuit 31 which is activated by placing slide switch 218 into the center or automatic position. The power supply functions differently with the lights on than with the lights off. With the lights on, power is converted with the current transformer and full wave rectified with the bridge rectifier. When the lights are off, power is converted via a resistor and capacitor then half wave rectified in the circuit 35. The voltage is then preregulated in the circuit 37 and filtered with capacitor 38. The voltage is then regulated with voltage regulator 40 which provides the circuitry with a maintained 5 VDC source and the bias voltage used by circuits 16, 18 and 20, and operational amplifiers 48 and 50.

Load control switch 34, which is a double pole three position slide switch, is provided so that all, none or one half of the lights are actuated upon infrared energy detection. As shown in FIG. 2, power line 56, which contains the DC voltage signal after it has been rectified, preregulated, and filtered, leaves the dual power supply circuit and enables the latching relay control circuit 52 to activate the control of the lights.

Operational amplifiers 48, 50 function as comparators driven from the timing circuit 30, to provide a pulse to the latching relay through the latching relay control circuit 50. Once the time delay period is over, the operational amplifiers 48 and 50 will change to the opposite state and cycle the relay contacts open, thereby turning off the lights.

FIG. 3 is a schematic representation of an energy efficient light system detecting a person operating a computer in a bounded area or room containing two banks of lights. A standard room 11 has first and second banks of lights 13 and 15. In actual use, the lights are intermixed so that all lights on one circuit would only turn on one half the available lights. A field of view of the switch 2 in this example is a sweep of approximately 170° due to the two detectors. The switch 2 replaces the conventional dual toggle switch mounted into the wall on the door. A computer work station 19 is positioned within the filed of view. The person 21 seated at the computer console emits infrared energy 25, which enters into the sweep view of the detector 2. Upon infrared energy detection, the switch 2 will either turn on the first bank of lights 13 or the second bank of lights 15 dependent upon the detection of the individual and the setting of the switch 2 to activate all, none or one half of the available lights.

While particular embodiments of the invention have been shown and described, it will be obvious to those skilled in the art that changes and modifications can be made without departing from the invention in its broader aspects and therefore the appended claims are intended to cover all such changes and modifications as followed in the true spirit and scope of the invention.

What is claimed is:

1. An energy efficient passive light switch operable to selectively activate all, none or a portion only of a bank of lights, comprising:

at least two passive detectors, together having a predefined sweep range and said detectors operable to detect energy emitted within a room within said sweep range, said detectors further operable to convert said received energy into a voltage signal;

at least one first amplification means for each of said detectors, for amplifying said received voltage signal for the respective passive defectors;

means for mixing said first amplified voltage signals from said passive defectors;

second amplification means for receiving said mixed first amplified received signals from said passive defectors and amplifying them a second time;

comparator means for comparing said received mixed amplified signals with a known predetermined signal;

a signal detection indicator operable to be activated when said received amplified mixed signal is within a predetermined range of said predetermined signal;

dual power supply means having a first and second power circuit for providing said predetermined signal to said comparator means and for providing power to said passive detectors; and selector means cooperatively associated with said passive switch including means to selectively preset said selector means in a first position to activate all of said lights, a second position to activate only a portion of said lights and a third position to not activate any of said light.

2. The energy efficient passive light switch of claim 1 wherein said switch is further operable to be mounted into a wall.

3. The energy efficient passive light switch of claim 1 wherein said lights are incandescent.

4. The energy efficient passive light switch of claim 1 wherein said lights are fluorescent.

5. The energy efficient passive light switch of claim 1 wherein said switch is operable to actuate one half of a bank of lights.

6. An automatic light switch operable to actuate all, none or a portion only of at least two lamps, comprising:

at least two passive detector means for detecting energy emitted from living entities within a bounded area and converting said received energy into a voltage signal;

first amplification means cooperatively associated with each of said detector means for amplifying said voltage signal;

mixing means for combining said individual first amplified received signals from said passive detector means;

second amplification means cooperatively associated with said mixing means, said second amplification means operable for amplifying said mixed first amplified voltage signal;

comparator means for comparing said twice amplified voltage signal to a predetermined bias voltage signal;

signal detection indicator means cooperatively associated with said comparator means, for actuating into the on position when said twice amplified mixed voltage signal is within a predetermined range of said predetermined bias voltage signal;

dual power supply means generating said predetermined bias voltage signal and further operable to provide power to said passive detectors;

a timing circuit means for providing time delay of the initiation of said automatic light switch;

a selector means for selectively activating all, none or a portion only of the lamps cooperatively associated with said automatic light switch including means to selectively preset said selector means in a first position to activate all of said lamps, a second position to activate a portion only of said lamps and a third position to not activate any of said lamps; and a latching relay coil further comprising a push-pull means for receiving a signal from said comparator means and turning on or turn off said preselected lamps cooperatively associated with said switch.

7. The automatic light switch of claim 6 wherein said switch is further operable to be operable to be mounted in a wall.

8. The automatic light switch of claim 6 wherein said lamps are incandescent.

9. The automatic light switch of claim 6 wherein said lamps are fluorescent.

10. The automatic light switch of claim 6 wherein said portion of the lamps actuated is one half.

11. An energy efficient automatic lighting system, comprising:

at least two lamp means for illuminating, mounted within a bounded area;

external power supply means for supplying said lamps with a predetermined voltage; and passive infrared light switch means, said switch means cooperatively associated with an between said lamps and said external power supply, presettingly actuating on or off all, none or a portion only of said lamps in response to infrared energy detected within said bounded area in a predetermined sweep range, wherein said passive infrared light switch means further comprises, at least two passive infrared detector means, said detector means for detecting infrared energy emitted within a bounded area within a predetermined sweep range thereof, said detector means further operable to convert said received infrared energy into a voltage signal for each of said passive infrared detector means, at least one first amplification means cooperatively associated with each of said passive infrared detectors for amplifying said received voltage signal, a mixer means for combining said amplified received voltage signals from said passive infrared detectors, a second amplification mans for amplifying said combined first amplified received voltage signal from said passive infrared detector means, a comparator means for comparing said combined twice amplified voltage signal with a known predetermined signal, a signal detection indicator means for indicating when said received combined twice amplified voltage signal is greater than said known predetermined signal, a timing means for delaying the initiation of said switch means activation, a dual power supply means having a first and second power circuit for supplying said known predetermined signal to said comparator means and further providing power to said passive infrared detectors, a selector means preset for selectively actuating all, none or a portion only of the lamp means cooperatively associated with said energy efficient lighting system, and a push-pull circuit further comprising a latching relay coil selectively actuating said lamp means.

12. A method of operating an energy efficient passive light switch means for selectively activating all, none or a portion only of a bank of lights, said method comprising the steps of:

detecting energy emitted within a room with at least two passive detector means within a sweep range thereof, and converting said received energy into a voltage signal;

amplifying said received voltage signal from each of said individual passive detector means with a first amplification means coupled thereto;

combining said first amplified voltage signals from said passive detector means;

receiving and amplifying said first amplified received voltage signals with a second amplification means;

comparing said received combined amplified voltage signals to a known predetermined signal with a comparator means;

indicating when said received combined amplified mixed signal is within a predetermined range of said predetermined signal;

providing a dual power supply means for providing said predetermined signal to said comparator means and further operable to provide power to said passive detector means;

selecting the actuation of all, none or a portion only of the lamps cooperatively associated with said passive switch by moving means for selecting into one of three positions, a first to actuate all of said lamps, a second position to actuate a portion only of the lamps and a third position to actuate none of the lamps; and activating all, none, or a portion only of the lamps cooperatively associated with said light switch upon detecting energy within the room by utilizing a push-pull circuit means comprising a latching relay.

13. A method of providing an automatic light switch means for actuating actuate all, none or a portion only of at least two lamps, said method comprising the steps of:

providing at least two passive infrared detector means for detecting infrared energy emitted from living entities within a bounded area and said detector means for converting said received infrared energy into a voltage signal;

providing a first amplification means cooperatively associated with each of said infrared detector means for amplifying said received voltage signal;

providing a mixing means for combining said individual first amplified received voltage signals from said passive infrared detector means;

providing a second amplification means cooperatively associated with said mixing means said second amplification means amplifying said combined first amplified voltage signals;

providing a comparator means for comparing said twice amplified voltage signal to a predetermined bias voltage signal;

providing a signal detection indicator means, cooperatively associated with said comparator means for actuating into the on position when said twice amplified combined voltage signal is within a predetermined range of said predetermined bias voltage signal;

providing a dual power supply means for generating said predetermined bias voltage signal and providing electrical energy to said passive infrared detector means;

providing a timing circuit means for time delaying the initiation of said automatic light switch;

providing a selector means for selectively activating all, none or a portion only of the lamps cooperatively associated with said automatic light switch; and providing a latching relay coil means for receiving a signal from said comparator means, turning on or off said preselected lamp means cooperatively associated with said switch.

14. A method of providing an energy efficient automatic lighting system, said method comprising the steps of:

providing at least two lamps mounted within a bounded area;

providing an external power supply means for supplying said lamps with a predetermined voltage; and providing a selectively actuating passive infrared light switch, said switch cooperatively associated with and between said lamps and said external power supply, said switch preset to selectively actuate on or off all, none or a portion only of said lamps in response to infrared energy detected within said bounded area in a predetermined sweep range, wherein said selectively actuating passive infrared light switch further comprises;

at least two passive infrared detector means operable to detect infrared energy emitted within a bounded area sweep range, said detector means converting said received infrared energy into a voltage signal for each of said passive infrared detector means, at least one amplification means for each of said passive infrared detector means for amplifying said received voltage signal, a mixer means, said mixer means for combining said amplified received voltage signals from said passive infrared detector means, a second amplification means for amplifying said mixed first amplified received voltage signal from said passive infrared detector means, a comparator means for comparing said twice amplified mixed twice amplified voltage signal with a known predetermined signal, a signal detection indicator means for indicating when said received amplified signal is greater than said known predetermined signal, a timing means for delaying the initiation of said switch activation, a dual power supply means having a first and second power circuit for generating said known predetermined signal to said comparator means and for generating electrical energy to said passive infrared detector means, a preset selector means for selectively actuating all, none or one half of the lamps cooperatively associated with said energy efficient lighting system, and a push-pull circuit means for selectively mechanically actuating said lamp means on or off in response to said comparison of said twice amplified combined voltage signal and a predetermined range of a bias signal.

* * * * *

UNITED STATES PATENT AND TRADEMARK OFFICE
CERTIFICATE OF CORRECTION

PATENT NO. : 5,142,199

DATED : August 25, 1992

INVENTOR(S) : Brian E. Elwell

It is certified that error appears in the above-identified patent and that said Letters Patent is hereby corrected as shown below:

Column 7, line 52, delete "mans" and substitute therefor

--means--.

Signed and Sealed this

Thirty-first Day of August, 1993

Attest:

BRUCE LEHMAN

*Attesting Officer*   *Commissioner of Patents and Trademarks*